United States Patent
Kumbhare et al.

(10) Patent No.: US 9,225,635 B2
(45) Date of Patent: Dec. 29, 2015

(54) SWITCH ROUTING TABLE UTILIZING SOFTWARE DEFINED NETWORK (SDN) CONTROLLER PROGRAMMED ROUTE SEGREGATION AND PRIORITIZATION

(71) Applicant: International Business Machines Corporation, Armonk, NY (US)

(72) Inventors: Abhijit P. Kumbhare, San Jose, CA (US); Dayavanti G. Kamath, Santa Clara, CA (US); Vijoy A. Pandey, San Jose, CA (US); Nilanjan Mukherjee, Santa Clara, CA (US)

(73) Assignee: International Business Machines Corporation, Armonk, NY (US)

( * ) Notice: Subject to any disclaimer, the term of this patent is extended or adjusted under 35 U.S.C. 154(b) by 181 days.

(21) Appl. No.: 13/859,660

(22) Filed: Apr. 9, 2013

(65) Prior Publication Data

US 2013/0266007 A1    Oct. 10, 2013

Related U.S. Application Data

(60) Provisional application No. 61/622,367, filed on Apr. 10, 2012.

(51) Int. Cl.
*H04L 12/771* (2013.01)
*H04L 12/715* (2013.01)
*H04L 12/717* (2013.01)

(52) U.S. Cl.
CPC ............... *H04L 45/56* (2013.01); *H04L 45/42* (2013.01); *H04L 45/64* (2013.01)

(58) Field of Classification Search
None
See application file for complete search history.

(56) References Cited

U.S. PATENT DOCUMENTS

| 7,912,052 | B2 | 3/2011 | DeSanti et al. | |
| 7,953,865 | B1 | 5/2011 | Miller et al. | |
| 8,432,791 | B1* | 4/2013 | Masters | 370/221 |
| 8,472,324 | B1* | 6/2013 | Richardson et al. | 370/235 |
| 2004/0006640 | A1* | 1/2004 | Inderieden et al. | 709/242 |
| 2007/0097973 | A1* | 5/2007 | Scudder et al. | 370/392 |
| 2011/0261722 | A1 | 10/2011 | Awano | |

(Continued)

FOREIGN PATENT DOCUMENTS

| EP | 2 355 423 A1 | 8/2011 |
| WO | 2012-032864 A1 | 3/2012 |

OTHER PUBLICATIONS

Sarrar et al., "Towards Hardware Accelerated Software Routers," ACM CoNEXT Student Workshop, Nov. 30, 2010, pp. 1-2.
Kind et al., "SplitArchitecture: Applying the Software Defined Networking Concept to Carrier Networks," World Telecommunications Congress, Mar. 5-6, 2012, pp. 1-6.

(Continued)

*Primary Examiner* — Chi H Pham
*Assistant Examiner* — Vladislav Agureyev
(74) *Attorney, Agent, or Firm* — Zilka-Kotab, PC

(57) ABSTRACT

In one embodiment, a system includes a network having a plurality of switches and one or more devices connected to one or more of the plurality of switches, a software defined network (SDN) controller connected to one or more of the plurality of switches in the network, the SDN controller having logic integrated with and/or executable by a processor, the logic being adapted to determine SDN routes through the network between the one or more devices and each of the plurality of switches and send one or more SDN routes to each switch in the network capable of communicating with the SDN controller. In other embodiments, methods and computer program products are also described for providing SDN routes through a network.

20 Claims, 5 Drawing Sheets

(56) References Cited

U.S. PATENT DOCUMENTS

| | | |
|---|---|---|
| 2011/0261825 A1 | 10/2011 | Ichino |
| 2013/0060929 A1* | 3/2013 | Koponen et al. .............. 709/224 |
| 2013/0163427 A1* | 6/2013 | Beliveau et al. .............. 370/235 |
| 2013/0223226 A1* | 8/2013 | Narayanan et al. ........... 370/236 |
| 2013/0250770 A1* | 9/2013 | Zou et al. ...................... 370/238 |

OTHER PUBLICATIONS

Monsanto et al., "A Compiler and Run-time System for Network Programming Languages," POPL'12, Jan. 25-27, 2012, pp. 1-14.

Sarrar et al., "FIBIUM: Towards Hardware Accelerated Software Routers," Deutsche Telekom Laboratories, Technical Report No. 9, Nov. 2010, pp. 1-17.

* cited by examiner

SWITCH ROUTING TABLE UTILIZING SOFTWARE DEFINED NETWORK (SDN) CONTROLLER PROGRAMMED ROUTE SEGREGATION AND PRIORITIZATION

RELATED APPLICATIONS

This application claims priority to provisional U.S. Patent Application Ser. No. 61/622,367 filed on Apr. 10, 2012, which is herein incorporated by reference.

BACKGROUND

The present invention relates to network switches and switching, and more particularly, this invention relates to using a software defined network (SDN) controller to segregate and prioritize SDN-controlled routes in a switch routing table.

One goal of a SDN is to allow the network to be programmable via a SDN controller. The SDN controller is typically physically separated from any of the controlled network switches, but is not necessarily located remotely therefrom. One method that allows for programmability of the network may involve the use of the OpenFlow communication protocol. However, other applications that may allow for programmability of the network either now or in the future may be used, in addition to or in place of OpenFlow, as would be understood by one of skill in the art upon reading the present descriptions.

Other methods that allow for the network to be programmable involve more traditional approaches, such as simple network management protocol (SNMP), network configuration protocol (NetConf), etc. In future versions of OpenFlow, support may be added for programming layer 3 IPv4 and layer 3 IPv6 Forwarding Elements via OpenFlow. Layer 3 forwarding element programming via OpenFlow may add support to program the layer 3 forwarding table, also referred to as a Forwarding Information Base (FIB). In contrast to the Routing Information Base (RIB), the FIB is optimized for fast longest prefix match lookup of a destination internet protocol (IP) address and may be used for data path forwarding. OpenFlow layer 3 forwarding element programming may be used by SDN user applications to program the layer 3 forwarding tables, in some conventional uses.

However, programming the FIB does not provide the flexibility to learn routes via traditional methods and devices utilizing routing protocols, such as routing information protocol (RIP), open shortest path first (OSPF), border gateway protocol (BGP), etc., as well as via SDN utilizing a suitable application, such as OpenFlow or some other suitable application known in the art. Furthermore, programming the FIB does not provide any method to prioritize between traditional and calculated routes should there be any conflict.

These drawbacks to conventional techniques have consequences, such as layer 3 SDN programming only being capable of completely replacing current distributed routing protocols/algorithms. Accordingly, in order to overcome the drawbacks of conventional systems, it would be beneficial to have a SDN using a suitable application that is capable of complementing traditional routing protocols/algorithms.

SUMMARY

In one embodiment, a system includes a network having a plurality of switches and one or more devices connected to one or more of the plurality of switches, a software defined network (SDN) controller connected to one or more of the plurality of switches in the network, the SDN controller having logic integrated with and/or executable by a processor, the logic being adapted to determine SDN routes through the network between the one or more devices and each of the plurality of switches and send one or more SDN routes to each switch in the network capable of communicating with the SDN controller.

In another embodiment, a SDN controller has logic integrated with and/or executable by a processor, the logic being adapted to execute an application to determine SDN routes through a network, each route including at least one switch, and send the SDN routes to at least one switch in the network capable of communicating with the SDN controller, the switch being designated in the SDN routes.

According to another embodiment, a method includes determining SDN routes through a network between one or more devices and each of a plurality of switches and sending one or more SDN routes to each switch in the network.

Other aspects and embodiments of the present invention will become apparent from the following detailed description, which, when taken in conjunction with the drawings, illustrate by way of example the principles of the invention.

DETAILED DESCRIPTION

Figure 1:
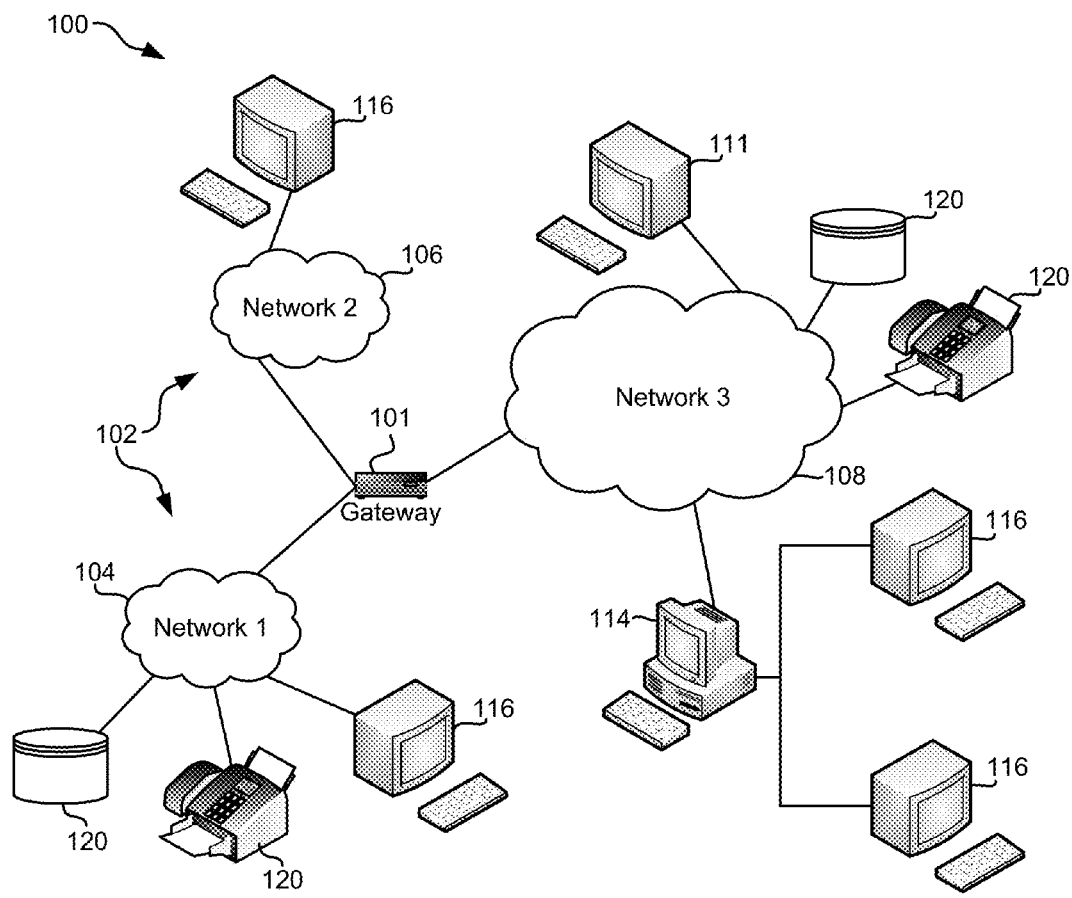
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified.

In order to overcome the drawbacks of conventional systems, it would be beneficial to have a software defined network (SDN) using a suitable application, such as an application that adheres to the OpenFlow communication protocol or some other suitable application known in the art, that is capable of complementing traditional routing protocols/algorithms, since this appears to be a most likely transition case for current implementation within an established network. This network would allow for SDN layer 3 routes to override routes learned via any traditional routing protocols, possibly sometime in the future.

In one embodiment, the layer 3 entries, e.g., internet protocol (IP) address prefix and subnet mask/prefix length, may be programmed via an SDN controller to the layer 3 routing table, e.g., the Routing Information Base (RIB), and not to the forwarding table, e.g., the Forwarding Information Base (FIB). The SDN routes may be classified into separate types in the RIB so that there is the ability to prioritize these SDN routes before/over other routes learned via tradition routing protocols, such as routing information protocol (RIP), open shortest path first (OSPF), border gateway protocol (BGP), etc.

In one general embodiment, a system includes a network having a plurality of switches and one or more devices connected to one or more of the plurality of switches, a software defined network (SDN) controller connected to one or more of the plurality of switches in the network, the SDN controller having logic integrated with and/or executable by a processor, the logic being adapted to determine SDN routes through the network between the one or more devices and each of the plurality of switches and send one or more SDN routes to each switch in the network capable of communicating with the SDN controller.

In another general embodiment, a SDN controller has logic integrated with and/or executable by a processor, the logic being adapted to execute an application to determine SDN routes through a network, each route including at least one switch, and send the SDN routes to at least one switch in the network capable of communicating with the SDN controller, the switch being designated in the SDN routes.

According to another general embodiment, a method includes determining SDN routes through a network between one or more devices and each of a plurality of switches and sending one or more SDN routes to each switch in the network.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A non-transitory computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium include the following: a portable computer diskette, a hard disk, a random access memory (RAM), a read-only memory (ROM), an erasable programmable read-only memory (EPROM or Flash memory), a portable compact disc read-only memory (CD-ROM), a Blu-ray disc read-only memory (BD-ROM), an optical storage device, a magnetic storage device, or any suitable combination of the foregoing. In the context of this document, a non-transitory computer readable storage medium may be any tangible medium that is capable of containing, or storing a program or application for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a non-transitory computer readable storage medium and that can communicate, propagate, or transport a program for use by or in connection with an instruction execution system, apparatus, or device, such as an electrical connection having one or more wires, an optical fiber, etc.

Program code embodied on a computer readable medium may be transmitted using any appropriate medium, including but not limited to wireless, wireline, optical fiber cable, radio frequency (RF), microwaves, etc., or any suitable combination of the foregoing.

Computer program code for carrying out operations for aspects of the present invention may be written in any combination of one or more programming languages, including an object oriented programming language such as Java, Smalltalk, C++, or the like, and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN), storage area network (SAN), and/or a wide area network (WAN), or the connection may be made to an external computer, for example through the Internet using an Internet Service Provider (ISP). Any of the networks may be actual physical networks or virtual networks provided by one or more devices.

Aspects of the present invention are described herein with reference to flowchart illustrations and/or block diagrams of methods, apparatuses (systems), and computer program products according to various embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, handheld computer, printer, and/or any other type of logic-containing device. It should be noted that a user device 111 may also be directly coupled to any of the networks, in some embodiments.

A peripheral 120 or series of peripherals 120, e.g., facsimile machines, printers, scanners, hard disk drives, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used, as known in the art.

Figure 2:
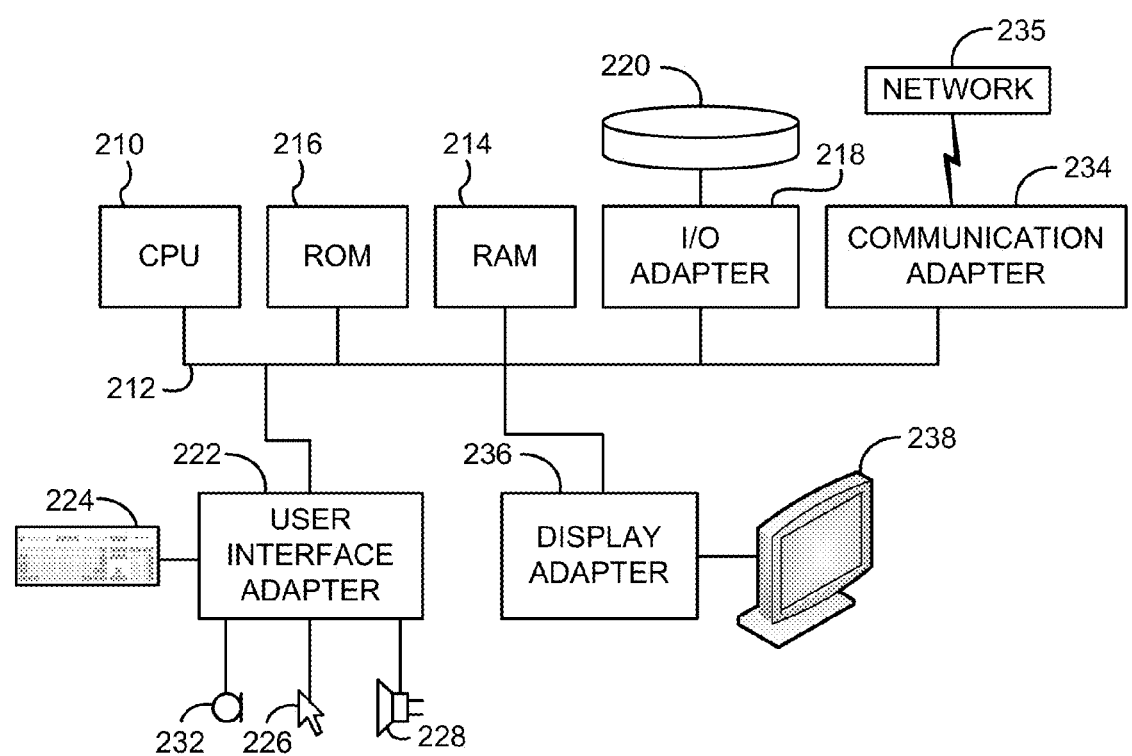
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. FIG. 2 illustrates a typical hardware configuration of a workstation having a central processing unit 210, such as a microprocessor, and a number of other units interconnected via a system bus 212, according to one embodiment.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen, a digital camera (not shown), etc., to the bus 212, communication adapter 234 for connecting the workstation to a communication network 235 (e.g., a data processing network) and a display adapter 236 for connecting the bus 212 to a display device 238.

The workstation may have resident thereon an operating system such as the MICROSOFT WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

The FIB is a layer 3 construct for fast forwarding of layer 3 packets. Some layer 2 information, such as a next hop's MAC address, VLAN, outgoing interface (port), etc., may be embedded in the FIB in order to aid in determining where to send packets on layer 2 network connections. In contrast, the RIB is a layer 3 only construct. Layer 3 IP address prefix and prefix length are programmed by the SDN controller via OpenFlow or some standard or proprietary interface, like SNMP, NetConf, CLI scripts, interface to routing system (I2RS), etc., to the controlled switches. This layer 3 information is proposed to be programmed to the layer 3 routing table and/or the RIB, rather than the FIB. The I2RS is an Internet Engineering Task Force (IETF) draft that is currently being created. I2RS also proposes to be programming the RIB rather than the FIB, similar to some embodiments described herein.

The SDN routes may be classified according to a separate type in the RIB so that there is a way to distinguish these routes from all the other routes in the RIB. One way that this distinction may be used is to prioritize these SDN routes, possibly by making these SDN routes have a higher priority than the other routes statically programmed (such as by a user, administrator, application, etc.) or learned via traditional routing protocols (such as RIP, OSPF, BGP, etc.). Since the SDN route may be classified into a separate route type—a network administrator may decide to prioritize the SDN routes over any other type of route for all of the controlled switches, a portion of the controlled switches, controlled switches individually, etc. In one embodiment, the network administrator may accomplish this prioritization by setting an administrative distance of SDN routes to be a higher priority than the OSPF, BGP, RIP, and/or static routes.

In one approach, the RTM may determine which routes are preferred based on administrative distance of the protocol and/or by policies set by the configured route maps. SDN works in conjunction with the existing routing protocols and makes it a contributor, and perhaps SDN routes are given some preference.

The network administrator or some other user or application may also add policies governing certain SDN routes to be prioritized over the other route types. This may be accomplished by configuring appropriate route-maps for particular SDN routes, according to one approach, either automatically or manually.

In essence, any SDN route may be treated similarly to any other route type in the RIB, except that it may be of a SDN type. Therefore, the following route types may be included in the RIB—connected interface, static routes, external BGP, OSPF, RIP, intermediate system to intermediate system (IS-IS), internal BGP, and SDN routes. Of course, other route types not specifically enumerated here may also be included, and may have their own routing type designation or simply be considered one of the other routing types.

According to one embodiment, a traditional network may function mostly as it currently does (e.g., with distributed route algorithms), with some override input from SDN applications running on a central SDN controller, such that any SDN application may specify a separate treatment for certain routes. Thus, there will be reduced barriers standing in the way of SDN adoption for current networks and migration pains may be significantly reduced as compared to a complete overhaul of distributed routing algorithms by central topology discovery routing algorithms, as would be necessary without the methods and systems described herein.

Figure 3:
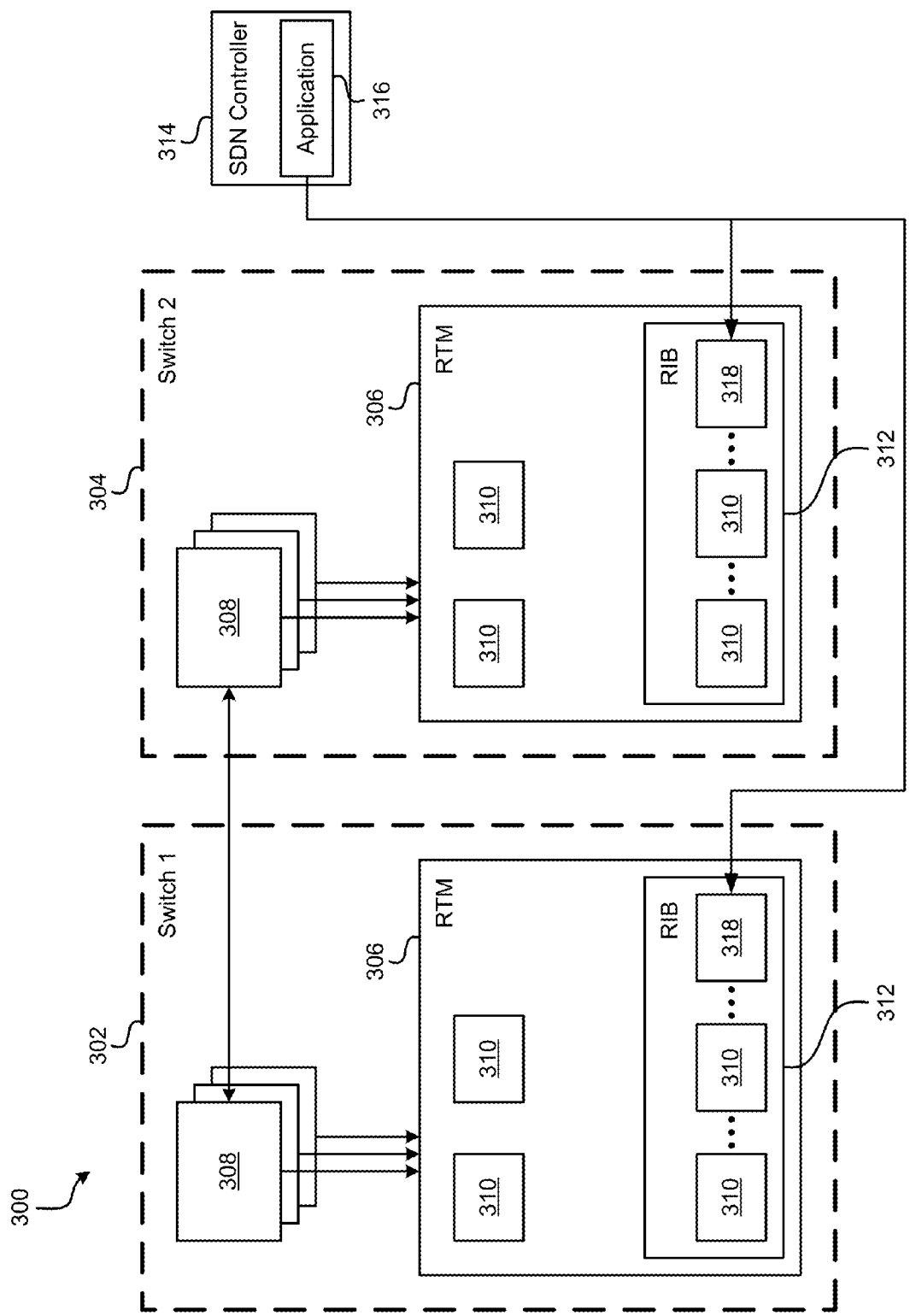
FIG. 3 is a simplified diagram of a network system, according to one embodiment.

Now referring to FIG. 3, a simplified diagram of a network system 300 is shown according to one embodiment. The system includes two switches 302, 304, with each switch having a route table manager (RTM) 306 that is capable of combining routes 310 from all sources 308 (e.g., connected interface, static routes, external BGP, OSPF, RIP, IS-IS, internal BGP, SDN routes, etc.) to form the RIB 312. The SDN controller 314 may provide input to the RTM 306 for each switch 302, 304 to produce SDN routes 318 which may be prioritized versus other protocol routes 310 in the RIB 312. Furthermore, an application 316 running on the SDN controller 314 may provide the logic and/or algorithm for calculating the SDN routes 318, in one approach. The application 316 may operate according to OpenFlow or some other suitable application known in the art.

Figure 4:
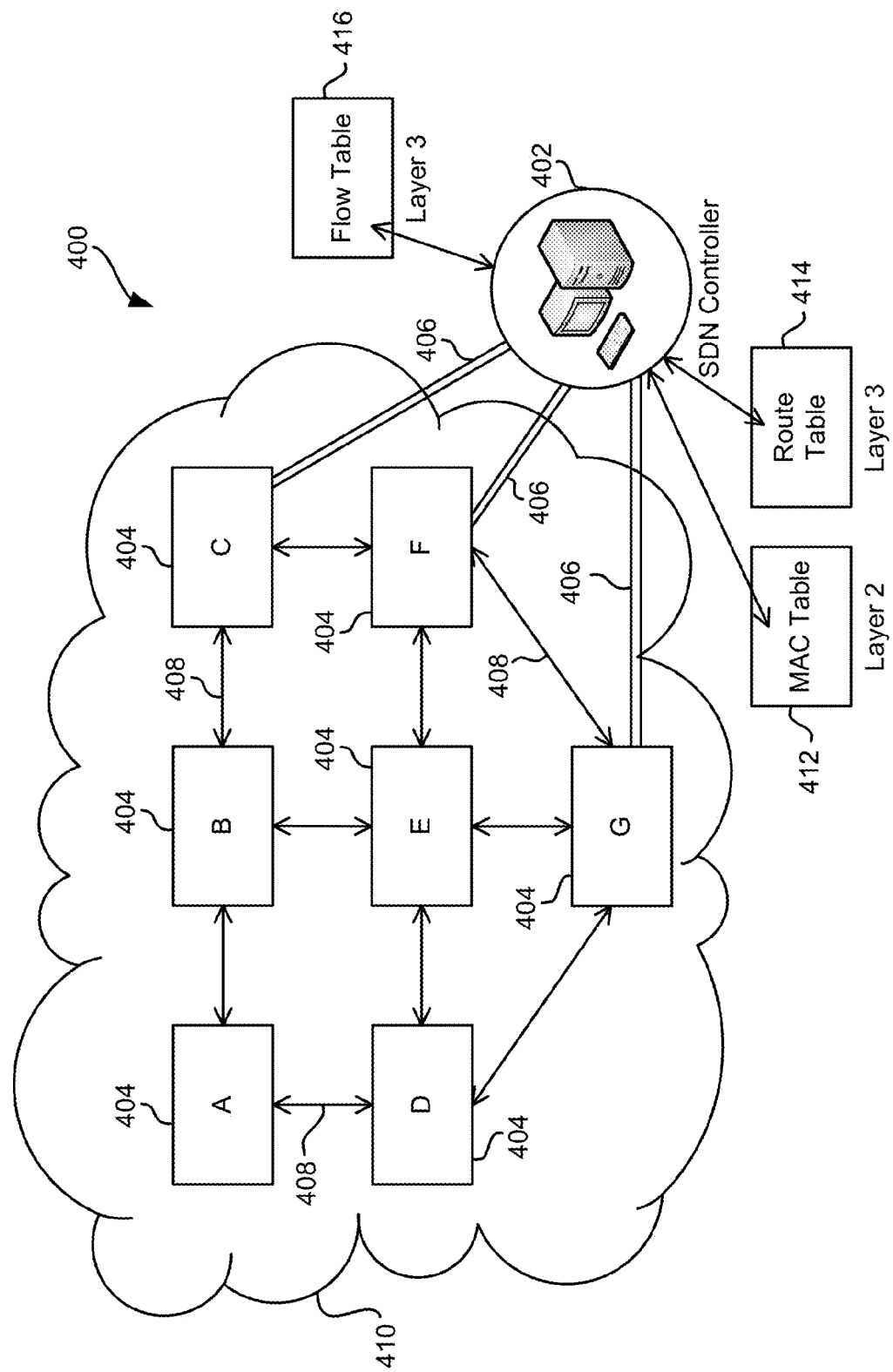
FIG. 4 shows a simplified network system diagram, according to one embodiment.

Now referring to FIG. 4, a simplified diagram of a network system 400 is shown, according to one embodiment. The system 400 comprises switches A-G 404, each switch 404 connected in a network 410 via connections 408 of any known type, such as Ethernet (Cat 5, Cat5e, etc.), fiber channel (FC), optical fiber, coaxial cabling, multi-mode fiber, etc.

The switches 404 may make use of a media access control (MAC) table 412 and a route table 414 within each switch 404 for choosing transmission routes between devices in the network 410, depending on whether the traffic is layer 2 or layer 3. The MAC table 412 may be used to determine destination addresses for layer 2 traffic, while the route table 414 may be used to determination routes for delivery of layer 3 traffic.

With a SDN 410, route calculation functionality for each of the switches 404 may be moved from the processors (CPUs) of the switches 404 to a different system which is not a switch or a router, but more of a general purpose computer which may be referred to as the SDN controller 402. The SDN controller 402 may perform the route calculations and send the route calculations to the switches 404, but not necessarily the route information. Thus, one approach essentially moves away from a distributed mechanism, to a centralized mechanism, where a controller 402 is learning everything about the whole network 410 and configures the route tables 414 and MAC tables 412 in a status which ultimately is used to decide which packet is delivered through which route.

This approach is not expected to be readily accepted, because it is different than what has been in use for the last 20 years or so. However, with a SDN 410, the system 400 may receive input from applications to decide specifically which routes to use. This is preferred, and is a hybrid kind of network, which may also leverage distributor routing protocols analysis. User controls may also be provided to provide a measure of control over these routes, as well as setting priorities between these routes. In a preferred embodiment, instead of putting information in the MAC table (also referred to as a forwarding table) 412, it is put in the route table 414 and used as a different route type. If the SDN programmed route is not present as a different route type, the route may only be programmed as a static route or an existing route type, and the system will not be able to distinguish between Open-Flow/SDN routes and existing route types (for example static route). One embodiment provides control over the behavior when choosing between SDN routes and existing route types.

In a sense, the SDN controller 402 may create or have a route similar to that which is learned by the traditional protocols OSPF, BGP, static routes, etc. Some routes may be learned based on protocols, such as OSPF, BGP, etc. These routes may be considered along with the SDN routes, in one approach. In another approach, SDN routes may be considered in addition to static routes.

The system 400 includes the SDN controller 402 adapted for determining SDN routes through the network 410, possibly based on one or more applications operating on the SDN controller 402, such as OpenFlow. The SDN routes may be included in a RIB on each switch A-G 404, along with other route types determined according to other methods, such as static routes, BGP, OSPF, etc.

The SDN controller 402 may be connected to one or more switches 404 via one or more connections 406 of a type known in the art, such as out-of band management paths, control channel (in an out-of-path Ethernet connection), Ethernet, FC, optical fiber, coaxial cabling, multi-mode fiber, etc.

For the sake of simplicity, the route table 414 and MAC table 412 are shown as single entities; however, as stated previously, each switch 404 includes each of the tables therein, and the SDN controller 402 is capable of accessing and modifying each table in each switch 404 separately.

In one embodiment, the SDN routes may be considered as higher in priority versus routes created using other protocols and/or static routes, depending on any number of factors, such as administrative distance. An administrative distance may be configured on a switch 404 that instructs the switch 404 to prefer all of one type of route over another. For example, OSPF routes may be preferred compared to all BGP routes. In one approach, the switch 404 may able to choose which type of route to use between all types of routes available in the route table 414.

In further embodiments, which routes to use may be determined solely by the SDN controller 402 upon full integration with the system 400, thereby rendering the other protocols as unnecessary. However, even when this full integration occurs, the other protocols may continue to operate, in case any legacy or previously installed systems or devices continue to make use of the routes provided by the other protocols.

The routing determinations for the network 410 are usually performed by the distributor of the routing protocols. In one approach, the distributor of the routing protocols may be the SDN controller 402. There are algorithms that exchange information between each switch 404 in the network 410, and these algorithms may ultimately come up with what is called a route table based on the exchange of that information. Conventionally, there is a route table 414 in each switch 404. Each of these route tables may be programmed from different design protocols, or they may be statically configured. A routing protocol may also provide routes to the route table 414, and these route tables 414 may learn from different sources, using different routing protocols. In one approach, a user may configure the route table 414 in each switch 404.

In a typical networking system, the way that protocol modules interact is by choosing the best routes through the network 410. There may be any order of protocol preference which is used to determine what is considered a best route over some other route. In addition, an internal priority mechanism may be used to determine which protocol's routes are preferred. For example, OSPF routing protocol is typically given priority over RIP routing protocol. Therefore, all of those heuristics will be used to determine a route table 414 which all of these selected routes are stored in.

In one embodiment, in addition to these other protocols, the SDN controller 402 will provide an additional input to the route table 414. In another embodiment, the SDN controller 402 may allow the traditional routing protocols to run as normal, the SDN controller 402 may read the route table 414, modify the routes in some way based on knowledge of the network 410, and then reprogram the routes in the route table 414. In this way, a feedback loop is provided in the designation of the routes in the route table 414.

Several decisions may be performed by the SDN controller 402, because it might have inputs associated with how the applications are running in the network 410.

Various applications may talk with the SDN controller 402, and may even drive the route algorithms in some particular cases. In one approach, one or more applications may operate on the SDN controller 402.

In various embodiments, the way that SDN controllers 402 are implemented is that they alter flow tables. For example, in each switch 404, a route table 414 is in the hardware. The hardware entities may have a layer 2 table which deals with the MAC addresses only (MAC table 412) and perhaps a layer 3 table (route table 414). Also present is a flow table 416, sometimes referred to as access control lists (ACLs) or some other name, the filter processor, or filter table, which has conversations with devices in the network 410. These conversations may be as generic or specific as desired. The best match is found for a route through the network 410 and the route table 414 is populated with these routes.

RIB refers to a route table 414, FIB refers to a forwarding table or MAC table 412, which is not necessarily the same as the flow table 416.

In one approach, the difference between the route table 414 and the flow table 416 is as follows: the flow table 416 defines a route from one place in the network 410 to another place in the network 410, or from everywhere in the network 410 to somewhere in the network 410. It captures a certain flow and some sort of communication that is headed somewhere or came from some destination. The route table 414 is going to specifically designate a route on a preferential basis.

In one embodiment, the route table 414 may specify a route to a given switch 404 or to a specific destination, or it is going to an end location somewhere and a route specifying how it is going to get there. Conceptually, it is a template for all of those devices. It may specify the classes of the addresses. It may specify how to get to an IP address.

In another embodiment, the system 400 performs a centralized computation and programs the flow table 416, optionally in conjunction with, and preferentially over, the network operating in a distributed manner with the switches 404 running protocols in a distributed manner and tables 412, 414 being computed on each switch 404.

One approach may be a hybrid system where everything else is running in a known manner, but the SDN controller 402 generates a preferred route, and in the route table 414, such route is segregated as a different SDN route type. This particular approach of having it as a different type is what allows rules to be applied to specific types of routes as a route map.

Prioritization of routes may be based on rules programmed into each switch 404 or administrative preferences, in various approaches. Preferences may be set by the administrator or may be based on the route maps. So the administrator may be given control on how the preferences are set up.

In one approach, the software-defined route is sent to each switch 404 and then, based on either the administrative preferences or something else, the switch 404 will pick which route to use. In another approach, the SDN controller 402 may specify that the software-defined route is to be given priority.

Figure 5:
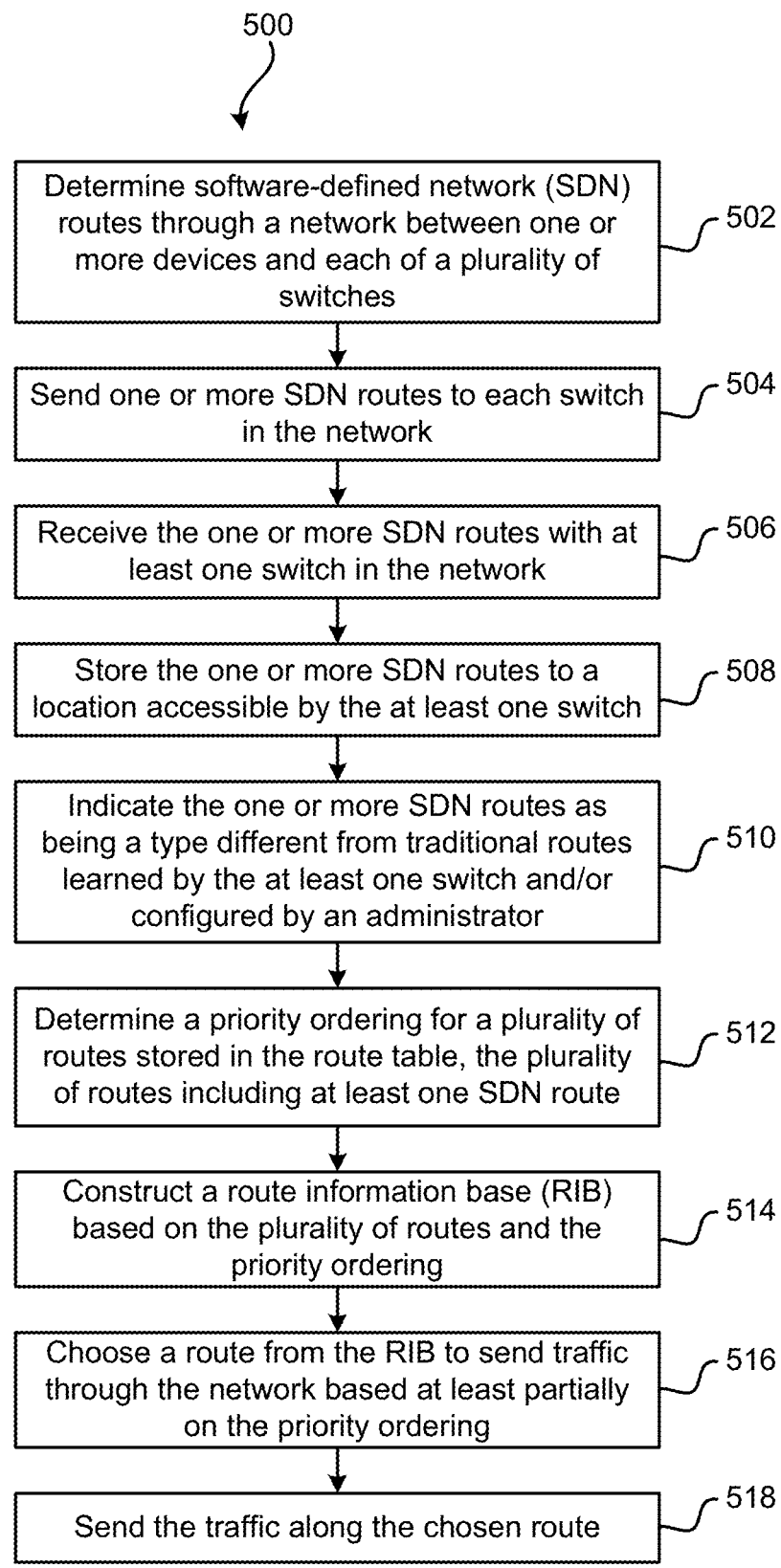
FIG. 5 shows a flowchart of a method, according to one embodiment.

Now referring to FIG. 5, a method 500 is shown according to one embodiment. The method 500 may be performed in accordance with the present invention in any of the environments depicted in FIGS. 1-4, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in one embodiment, the method 500 may be partially or entirely performed by a SDN controller, a processor (such as a CPU, an ASIC, an FPGA, etc.), a module, a function block, a switch, a router, etc., in various approaches.

As shown in FIG. 5, method 500 may initiate with operation 502, where SDN routes through a network between one or more devices and each of a plurality of switches are determined. The SDN routes are determined by the SDN controller or some other suitable device or processor in the network, or capable of analyzing the network and network connections.

In operation 504, one or more SDN routes are sent to each switch in the network. In one approach, only those switches which are capable of communicating with the SDN controller may be sent the SDN routes. In another embodiment, all switches are sent the SDN routes, and only those switches which understand the information store them. According to another embodiment, all switches in the network are capable of communicating with the SDN controller.

In operation 506, the one or more SDN routes are received using at least one switch in the network. The one or more SDN routes sent to the switch are specific to that switch, e.g., the SDN routes are tailored for that specific switch, and only routes which concern that particular switch are sent to it. Different SDN routes are sent to each different switch depending on the connections that each switch has.

In operation 508, the one or more SDN routes are stored to a location accessible by the at least one switch. For example, they may be stored to a route table, flow table, or some other medium that the switch may view, manipulate, or otherwise have access to. This storage operation may be performed by the switch.

In operation 510, the one or more SDN routes are indicated as being a type different from traditional routes learned by the at least one switch and/or configured by an administrator. This may be accomplished using a flag, a marker, a bit, or any other method of indicating a state, status, type, or difference. The other routes accessible to the switch may all have the same or different marker, or they may be indicated as belonging to their own individual groups. For example, each route from OPSF may be indicated as such, each SDN route may be indicated as such, each IS-IS route may be indicated as such, etc. In this way, the switch will be aware of which type of route it can choose from.

In operation 512, a priority ordering is determined for a plurality of routes stored in the location accessible by the at least one switch. The plurality of routes includes at least one SDN route, and may include many other different types of routes. In addition, more than one SDN route may also be included, and priority ordering may be performed on them all.

By ordering the routes according to priority, it may be determined which routes will be best for specific different scenarios. For example, low latency tasks, high speed tasks, important tasks, etc., may all be best served by choosing a different route through the network between an ingress and an egress port. The priority ordering may take all of this into account when determining the ordering.

In one embodiment, SDN routes may be allocated a higher priority than non-SDN routes.

In operation 514, a RIB is constructed based on the plurality of routes and the priority ordering. This may be performed by the switch or by the SDN controller for each switch. The RIB is stored local to the switch so that the switch has access to the RIB.

In operation 516, a route is chosen from the RIB to send traffic through the network based at least partially on the priority ordering. The nature of the traffic may also be taken into consideration when choosing a route, along with network congestion, network failures, device failures, alerts and warnings, specific requests that accompany the traffic (such as a request for low latency switches, etc.), or any other factor capable of affecting a route through the network.

In operation 518, the traffic is sent along the chosen route, such as by forwarding the traffic to a first hop as designated by the chosen route.

In one embodiment, which route to choose may be dictated prior to making the choice. For example, if the switch is choosing the route, the SDN controller may dictate to the switch which route to choose.

In another embodiment, the SDN controller may be further adapted to modify the RIB to alter the priority ordering of the routes prior to the switch choosing a route from the RIB.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A system, comprising:
a network, comprising:
   a plurality of switches; and
   one or more devices connected to one or more of the plurality of switches;
a software defined network (SDN) controller connected to one or more of the plurality of switches in the network, the SDN controller comprising logic integrated with and/or executable by a processor, the logic being configured to:
   determine SDN routes through the network between the one or more devices and each of the plurality of switches;
   send one or more SDN routes to each switch in the network capable of communicating with the SDN controller; and
   modify a routing information base (RIB) in each switch in the network capable of communicating with the SDN controller to alter a priority ordering of routes stored therein, the routes stored therein comprising the SDN routes sent to each switch in the network capable of communicating with the SDN controller and traditional routes, the traditional routes being routes learned by each switch, routes configured by an administrator, or a combination thereof,
   wherein the one or more SDN routes are indicated as being of a type different from the traditional routes stored by the plurality of switches.

2. The system as recited in claim 1, wherein the one or more SDN routes sent to each switch are specific to that switch, and wherein the logic integrated with and/or executable by the processor of the SDN controller is further configured to:
   read a RIB stored to at least one switch in the network; and
   reprogram at least one traditional route stored to the RIB based on the SDN controller's knowledge of the network.

3. The system as recited in claim 1, wherein at least one switch comprises logic integrated with and/or executable by a processor, the logic being configured to:
   receive the one or more SDN routes from the SDN controller;
   store the one or more SDN routes to a location accessible by the at least one switch; and
   indicate the one or more SDN routes as being a type different from traditional routes learned by the at least one switch and/or configured by an administrator.

4. The system as recited in claim 3, wherein the logic integrated with and/or executable by the processor of the at least one switch is further configured to:
   determine a priority ordering for a plurality of routes stored in the location accessible by the at least one switch, the plurality of routes including at least one SDN route;
   construct the RIB based on the plurality of routes and the priority ordering;
   choose a route from the RIB to send traffic through the network based at least partially on the priority ordering; and
   send the traffic along the chosen route.

5. The system as recited in claim 4, wherein the logic integrated with and/or executable by the processor of the SDN controller is further configured to dictate to the at least one switch which route to choose.

6. The system as recited in claim 4, wherein SDN routes are allocated a higher priority than non-SDN routes.

7. The system as recited in claim 4, wherein the logic integrated with and/or executable by the processor of the SDN controller is further configured to modify the RIB to alter the priority ordering of the routes prior to the processor of the at least one switch choosing a route from the RIB.

8. The system as recited in claim 1, wherein the SDN controller operates according to OpenFlow.

9. A software defined network (SDN) controller, comprising:
a hardware processor; and logic integrated with and/or executable by the hardware processor, the logic being configured to:
   execute an application to determine SDN routes through a network, each route comprising at least one switch;
   send the SDN routes to at least one switch in the network capable of communicating with the SDN controller, the switch being designated in the SDN routes; and
   modify a routing information base (RIB) in the at least one switch to alter a priority ordering of routes stored therein, the routes stored therein comprising the SDN routes sent to the at least one switch and traditional routes learned by the at least one switch and/or configured by an administrator.

10. The SDN controller as recited in claim 9, wherein the SDN routes sent to the at least one switch are specific to the at least one switch, and wherein the logic is further configured to:
   read the RIB stored to at least one switch in the network; and
   reprogram at least one traditional route stored to the RIB based on the SDN controller's knowledge of the network.

11. The SDN controller as recited in claim 9, wherein the logic is further configured to dictate to the at least one switch which route to choose from the RIB.

12. The SDN controller as recited in claim 11, wherein SDN routes are allocated a higher priority than non-SDN routes.

13. The SDN controller as recited in claim 9, wherein the SDN routes are indicated as being of a type different from traditional routes.

14. The SDN controller as recited in claim 9, wherein the SDN controller operates according to OpenFlow.

15. A method, comprising:
- determining, using a software-defined network (SDN) controller, SDN routes through a network between one or more devices and each of a plurality of switches capable of communicating with the SDN controller;
- sending one or more SDN routes from the SDN controller to each switch in the network; and
- modifying a routing information base (RIB) in each switch to alter a priority ordering of routes stored therein, the routes stored therein comprising the SDN routes sent to each switch and traditional routes, the traditional routes being routes learned by each switch, routes configured by an administrator, or a combination thereof,
- wherein the one or more SDN routes are indicated as being of a type different from the traditional routes stored by the switches in the network.

16. The method as recited in claim 15, wherein the one or more SDN routes sent to each switch are specific to that switch, and wherein the method further comprises:
- reading, using the SDN controller, a RIB stored to at least one switch in the network; and
- reprogramming, using the SDN controller, at least one traditional route stored to the RIB based on the SDN controller's knowledge of the network.

17. The method as recited in claim 15, further comprising:
- receiving the one or more SDN routes with at least one switch in the network;
- storing the one or more SDN routes to a location accessible by the at least one switch; and
- indicating the one or more SDN routes as being a type different from traditional routes learned by the at least one switch and/or configured by an administrator.

18. The method as recited in claim 17, further comprising:
- determining, using the SDN controller, a priority ordering for a plurality of routes stored in the location accessible by the at least one switch, the plurality of routes including at least one SDN route;
- constructing the RIB based on the plurality of routes and the priority ordering;
- choosing, using the at least one switch, a route from the RIB to send traffic through the network based at least partially on the priority ordering; and
- sending, using the at least one switch, the traffic along the chosen route.

19. The method as recited in claim 18, further comprising dictating to the at least one switch, using the SDN controller, which route to choose from the RIB.

20. The method as recited in claim 18, wherein SDN routes are allocated a higher priority than non-SDN routes.

\* \* \* \* \*